June 17, 1930.  J. A. KAUFMAN  1,764,106
BRICK MASON TOOL
Filed July 12, 1927
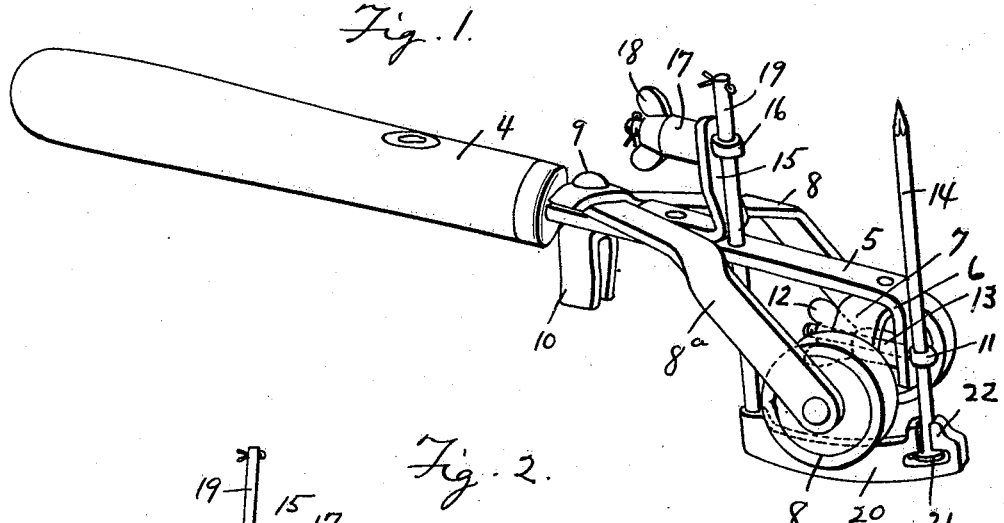
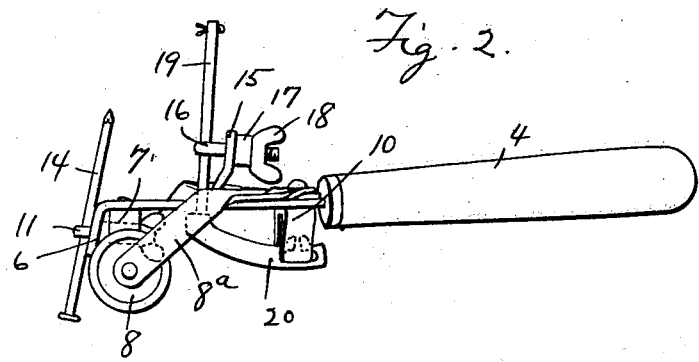
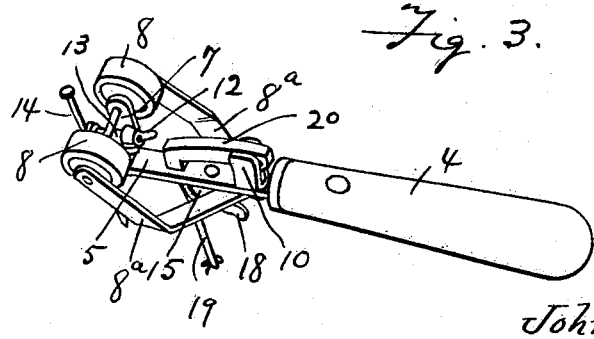
Inventor
John Adam Kaufman
By Clarence A. O'Brien
Attorney Patented June 17, 1930

1,764,106

UNITED STATES PATENT OFFICE

JOHN ADAM KAUFMAN, OF SEYMOUR, INDIANA

BRICK-MASON TOOL

Application filed July 12, 1927. Serial No. 205,080.

The present invention relates to an improved tool, which is particularly designed for use by brick masons, and due to the function which it serves, it may be properly entitled a combination raker and jointer.

It is obviously, the primary purpose of the invention to provide a simple and efficient implement or tool which facilitates raking and jointing work in masonry structures. At the present time, many make-shift devices are employed. These are rather crude, and are used free-hand, and even in the hands of an expert, they are disadvantageous.

The primary objection to the ordinary implements employed for this purpose, is that they perform in an uneven and hap-hazard manner, and smear the work and leave it unsightly.

What I propose therefor, is a modern and complete tool which is individualized by a characteristic arrangement of details functioning to produce a novel product embodying such exclusive and indispensible features as practicability, ease of manipulation, accuracy, and dependability.

Briefly the invention has reference to a structure of this kind which embodies a handle, a shank carried by the handle, guide rollers carried by the shank, an adjustable raker, and an efficient jointer.

Other features and advantages will become more readily apparent from the description and drawings.

In the drawings:

Figure 1 is a perspective view of the complete tool showing the jointer in position for use.

Fig. 2 is a view in slight perspective showing the jointer in an out-of-the-way position and the scraper in readiness for use.

Fig. 3 is an inverted perspective view of Fig. 2.

In the drawings, the reference character 4 designates a handle of appropriate configuration which carries, as before intimated, a shank 5. The shank is here shown in the form of a flat metal strip which has its free end portion downturned as at 6.

Fastened to the end portion of the shank, inwardly of the downturned end 6 is a substantially U-shaped mount 7 for a pair of small guide rollers or wheels 8. These are fastened upon the mounting as shown better in Fig. 3. Connected with the axle we find a pair of brace bars 8 which extends in converging relation toward the handle 4 and are riveted in superposed relation as at 9 to the inner end portion of the shank.

The same rivet is employed for connecting a retaining clip 10 in place. The purpose of this clip will be made apparent later. Carried by the downturned end 6 is an eye bolt 11, which has its shank portion extending between the arms of the mounting 7 and is provided on its screw threaded end with a thumb-nut 12.

Interposed between the thumb nut and the end 6 is a spacing sleeve 13. The purpose of this arrangement is to dispose the nut in a position to render it accessible. The purpose of the eye bolt is to provide a carrier for an ordinary wire nail 14 which has its head disposed downwardly. The wire nail constitutes the raker.

Mounted on the shank 5 is a substantially right angular bracket 15 carrying an eye bolt 16. Here again a spacing sleeve 17 is provided and a retaining nut 18. If desired, cotter keys may be employed on the threaded ends of the bolts to guard against displacement of the nut. The eye bolt 16 serves to accommodate a shaft 19 on the lower end of which is a right angularly disposed runner 20 which functions as a jointer. It will be noticed that the free end portion of the jointer is provided with a slot 21 to accommodate the head of the bolt, and space 22 providing an entrance to the slot. With this arrangement, it will be observed that the raking nail 14 has the additional function of aiding in holding the jointer 20 in operative position.

However, the jointer is constructed to permit it to be swung around beneath the shank and held in an out-of-the-way position as shown in Figs. 2 and 3. In this connection, the jointer is spaced between the jaws of the spring clip 10, which operates as a keeper therefor.

It will thus be seen that I have provided an efficient tool including a handle and a shank wherein the shank, carries a swingably mounted jointer, capable of being disposed out-of-the-way or in position for operation. When in the last named position, the raker 14 functions additionally in holding it in place. However, the jointer can be adjusted up as shown in Fig. 2 in an entirely out-of-the-way position to permit free operation of the nail as a rake.

This nail may in itself be adjusted vertically with respect to the peripheral portions of the side rollers in order to insure uniform depth when using the tool. The rollers function as guides and aid in steadying the device, thus insuring accuracy.

Undoubtedly, persons familiar with the ordinary make-shift devices employed for raking and jointing will clearly understand this invention, as well as the advantages and features which accompany the same.

In conclusion, it is to be stated that although I have shown and described, the particular and preferred embodiment of the invention, it is to be understood that minor changes in shape, size, and re-arrangement of details, coming within the scope of the adjoined claims may be resorted to in actual practice.

Having thus described my invention, what I claim as new is:—

1. In a tool of the class described, a handle, a shank carried by said handle, guide means carried by said shank, a raking implement adjustably mounted on the outer free end portion of said shank, a jointer having a vertical shaft pivotally mounted on and slidable through the intermediate portion of said shank, said raking implement cooperating with said jointer in aiding in holding said jointer in operative position, and separate retaining means on the shank for holding the jointer in an inoperative out of the way position.

2. In a tool of the class described, a handle, a shank carried by said handle, a vertical shaft pivotally mounted on and slidable through said shank, fastening means for said shaft carried by said shank, a right angularly disposed runner carried by said shaft and functioning as a jointer and located beneath said shank, and individual retaining devices for said jointer mounted on the inner and outer end portions respectively of said shank.

3. In a tool of the class described, a handle, a shank carried by said handle, a vertical shaft pivotally mounted on and slidable through said shank, fastening means for said shaft carried by the shank, a right angularly disposed runner carried by said shaft and functioning as a jointer, a retaining clip on said shank for holding said jointer in an out of the way ineffective position, and guide rollers carried by said shank, said jointer being adapted to be located between said guide rollers when in operative position.

4. In a mason tool of the class described, a handle, a shank rigidly mounted on said handle, and extending therefrom, a raking implement adjustably mounted on the outer end of said shank, guide rollers carried by said shank and located inwardly of said raking implement, said implement being disposed between said rollers, a shaft mounted on the intermediate portion of said shank, fastening means for said shaft, a runner carried by the lower end of the shaft, said runner functioning as a jointer and being provided with means for connection to said raking implement.

In testimony whereof I affix my signature.

JOHN ADAM KAUFMAN.